(No Model.) 2 Sheets—Sheet 1.
A. M. LITTLE.
MACHINE FOR MAKING EXCELSIOR.
No. 382,431. Patented May 8, 1888.
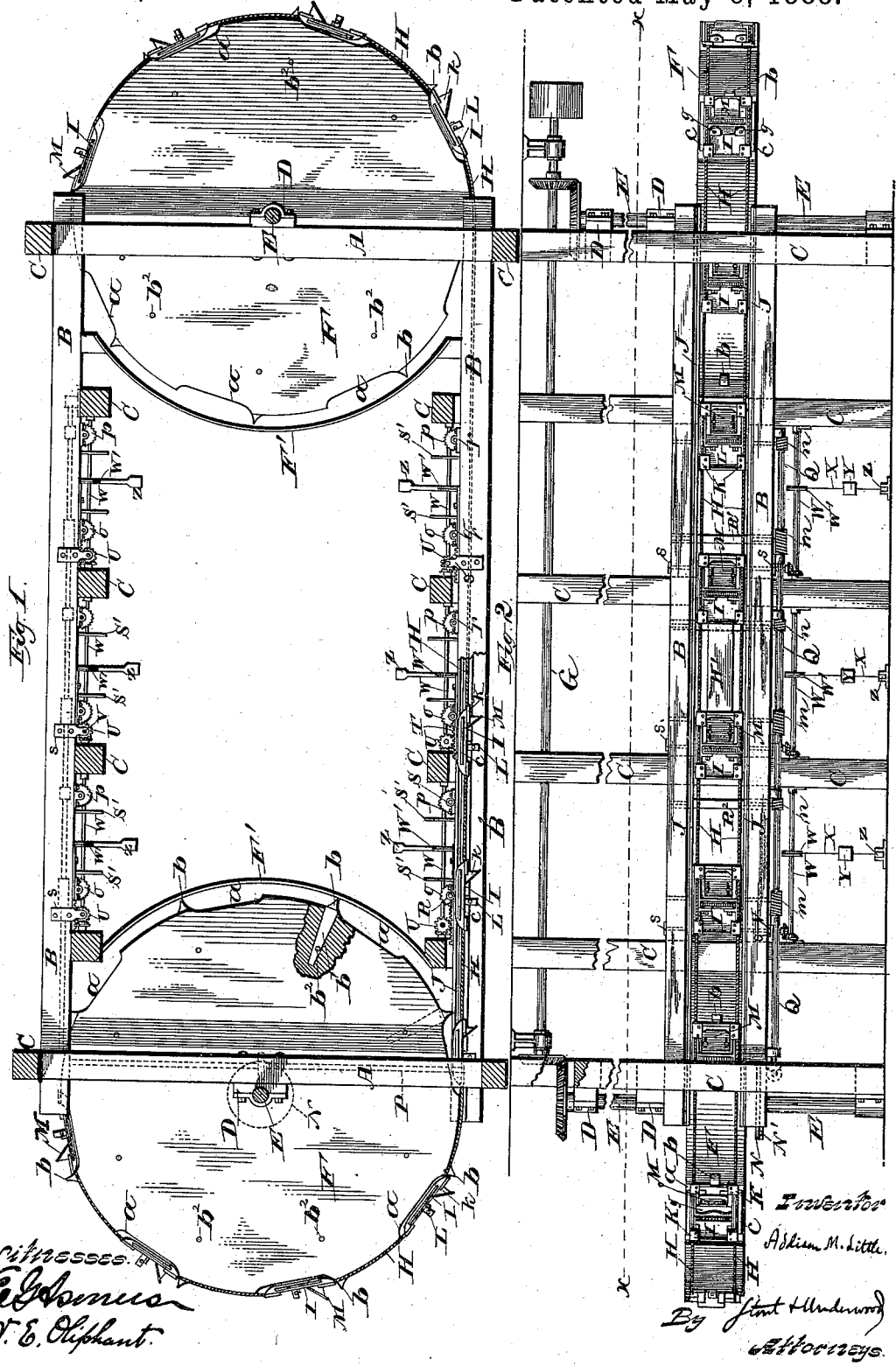

(No Model.) 2 Sheets—Sheet 2.
A. M. LITTLE.
MACHINE FOR MAKING EXCELSIOR.
No. 382,431. Patented May 8, 1888.
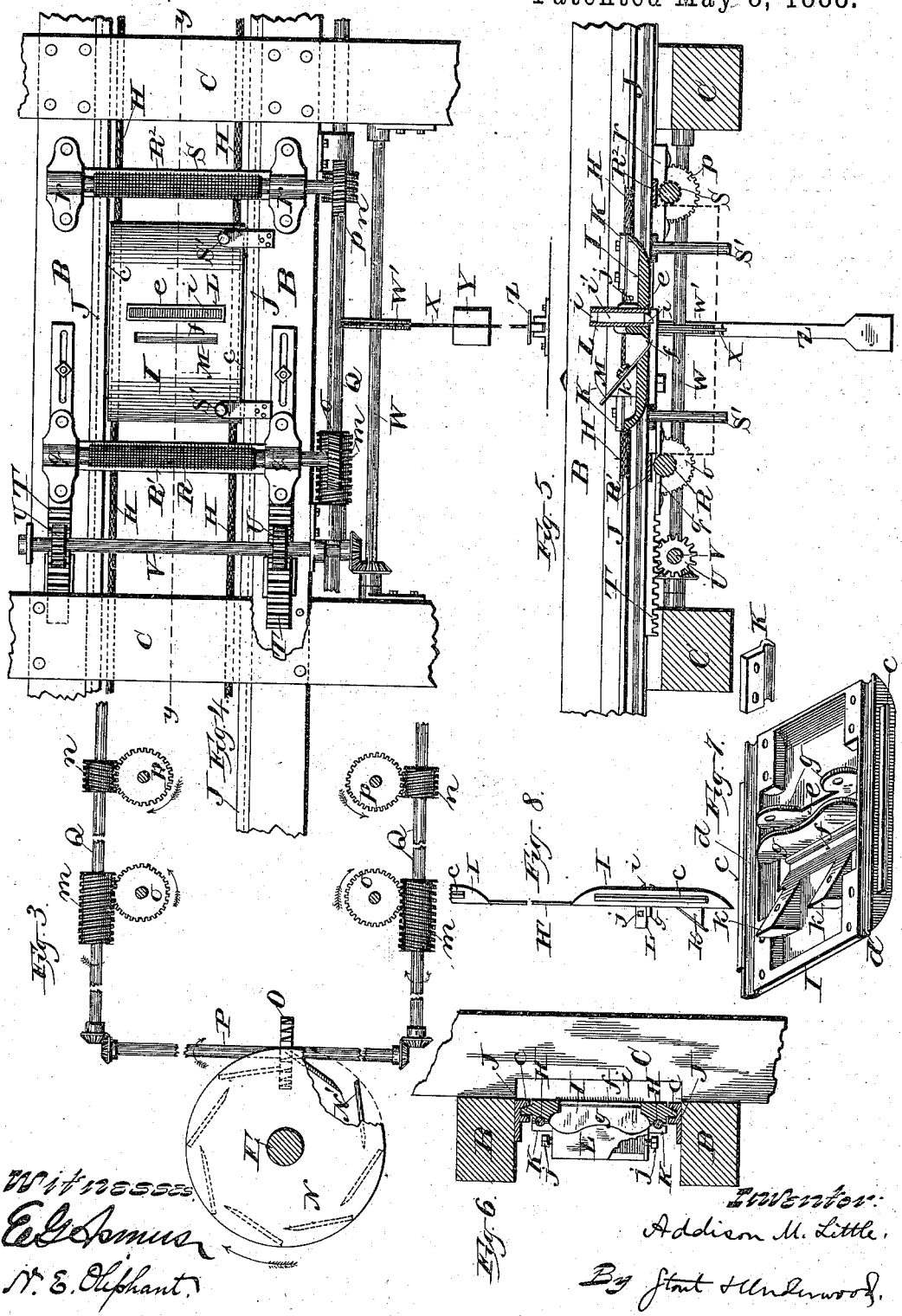
Witnesses:
E. G. Amus
N. E. Oliphant
Inventor:
Addison M. Little.
By Stout & Underwood,
Attorneys.

UNITED STATES PATENT OFFICE.

ADDISON M. LITTLE, OF MENASHA, WISCONSIN.

MACHINE FOR MAKING EXCELSIOR.

SPECIFICATION forming part of Letters Patent No. 382,431, dated May 8, 1888.

Application filed May 28, 1887. Serial No. 239,620. (No model.)

*To all whom it may concern:*

Be it known that I, ADDISON M. LITTLE, of Menasha, in the county of Winnebago, and in the State of Wisconsin, have invented certain new and useful Improvements in Machines for Making Excelsior; and I do hereby declare that the following is a full, clear, and exact description thereof.

My invention relates to machines for making excelsior; and it consists in certain peculiarities of construction and combination of parts, to be hereinafter described with reference to the accompanying drawings, and subsequently claimed.

In the drawings, Figure 1 represents a plan view of my machine on line $x\,x$, Fig. 2, and partly broken away; Fig. 2, a side elevation; Fig. 3, a detail view of the feed-gear; Fig. 4, a detail view in elevation of one of the sections as it appears on the inside; Fig. 5, a horizontal section on line $y\,y$, Fig. 4; Fig. 6, a vertical transverse section taken through the guide-timbers on one side of the machine; Fig. 7, a perspective view of one of the cutter-heads and a clamping-plate. Fig. 8 is a detail showing a guard-strip uniting each two of the cutter-heads.

Referring by letter to the drawings, A designates transverse end pieces, B longitudinal guide-timbers, and C a series of vertical standards that form the frame of my machine.

The transverse end pieces, A, are centrally provided with bearings D for vertical shafts E, that carry drums F, and are bevel-geared to a horizontal drive shaft, G, as illustrated in Fig. 2. Each of the drums F is provided on its periphery with a series of depressions, $a$, and I also prefer to provide said drums with a series of spurs, $b$, the latter corresponding in number with said depressions. The spurs $b$ may be secured to the drums in any suitable manner; but I prefer to provide them with wedge-shaped shanks $b'$, that are inserted in said drums and secured by pins $b^2$, as illustrated in Fig. 1.

An endless carrier, preferably composed of wire cables H, is arranged on the drums F, and has secured thereto at suitable intervals a series of cutter-heads, I, one of the latter being illustrated in detail by Fig. 7. Each cutter-head corresponds in length and contour to the depressions $a$ in the drums F, and is provided with longitudinal flanges $c$, that engage grooved tracks J on the guide-timbers B, as best illustrated in Fig. 6. Longitudinal grooves $d$ in each cutter-head engage the wire cables H, that compose the endless carrier, and correspondingly-grooved clamping-plates, K, are bolted to said head to thus secure the same on said carrier. Vertical slots $ef$ are cut in each cutter-head, and extending outward from the slot $e$ are flanges $g$, between which latter is inserted a box, L, for the slitter-knives $i$, said box being retained in position by set-screws $j$. Bolted to inclined lugs $k$ in each cutter-head, and arranged to have its cutting-edge come through the slot $f$ in said head, is an adjustable planer-knife, M, the latter being in the rear of the slitter-knives.

Fast on one of the vertical shafts E is a disk, N, that has a face thereof provided with a series of teeth, N', arranged to extend inward at an acute angle to the periphery of said disk. The teeth N' on the disk N come into mesh with a suitable pinion, O, on a transverse shaft, P, that is bevel-geared to longitudinal shafts Q, provided at intervals with worms $m$ $n$, that mesh with worm-wheels $o\,p$, respectively secured to corrugated feed-rollers R S. The feed-rollers R have their bearings $q$ on reciprocative rack-plates T, arranged upon the guide-timbers B, while the bearings R for the feed-rollers S are stationary on said guide-timbers.

Just in front of the feed-rollers R S, I arrange vertical clamp-plates R' R², the plate R' being movable with the rack-plates T, while the one R² is stationary. The teeth N' on the disk N are so arranged that they only actuate the pinion O at certain intervals, and thus an intermittent motion is communicated to the feed-rollers R S through the medium of the gearing above described.

Meshing with the rack-plates T are pinions U, the latter being arranged on vertical shafts V, that have their bearings $s$ on the guide-timbers B, and each of these vertical shafts is bevel-geared to one of a series of independent horizontal shafts, W, that have their bearings on the standards C. Each of the shafts W carries a disk, W', around which passes a rope or chain, X, that has secured to one end thereof a weight, Y, the other end of said rope or chain being connected to a treadle, Z. The weights Y serve to automatically keep the feed-rollers R and clamp-plates R' up against the blocks from which the excelsior is cut, said blocks being supported on brackets S', secured to the guide-timbers B between the several pairs of feed-rollers R S. By depressing any one of the treadles Z a rotary motion will be imparted to the corresponding shaft W, and through the gearing above described motion will be communicated to the rack-plates T, whereby the latter and the feed-roller R and the clamp-plate R', mounted thereon, will run back for the purpose to be hereinafter described.

As the operator of the machine occupies the space between the inner sides of the endless carrier, I provide guards F', to keep said operator from coming into contact with the drums F.

In the operation of my invention the blocks from which the excelsior is to be cut are placed on the supports S' and forced between the feed-rollers R S and clamp-plates R' R². The weights Y being heavy enough to more than overcome the strain that comes upon the blocks, the movable feed-rollers R and clamp-plates R' are automatically held tight upon said blocks. The endless carrier being continuously operated, the slitter-knives $i$ are first brought into contact with the blocks and make a series of cuts therein at a suitable distance apart, this distance being regulated by spacers $i'$, placed between said knives. It will be noticed by referring to Fig. 5 that the points of the slitter-knives $i$ are only beveled on one side, and by this construction there is less liability of said knives following the grain of the wood. The planer-knives M following immediately after the slitter-knives shave off the exposed face of the blocks to about the depth of the cuts previously made by the latter knives, the shavings thus made forming the excelsior. By means of the intermittent feed-gear above described the feed-rollers R S are revolved to move the blocks forward just after one set of cutter-heads have acted thereon, and this forward movement is discontinued just prior to the time the next succeeding cutter-heads come into contact with said blocks, said rollers remaining idle while the slitting and cutting is taking place.

When any of the blocks have passed out of contact with the feed-rollers R S, the chip is held by the clamping-plates R' R² until released by the operator. To release a chip, the clamp-plate R', impinged against the same, is run back by means of the mechanism above described, and being thus freed said chip drops down away from the machine. Ordinarily the chips will be held between the clamp-plates R' R² by the force of the weights Y; but to guard against any possibility of said chips being caught in the endless carrier, I may interpose flexible strips H' between the cutter-heads I, one of these strips being shown in Figs. 1, 2, and 8.

The drums F, of the peculiar construction above described, act in a capacity similar to that of sprocket-wheels, the depressions $a$ therein receiving the cutter-heads I on the endless carrier, while the spurs $b$ come against the rear of said cutter-heads to prevent any slipping of said carrier, and at the same time aid the propulsion thereof.

A continuous motion at a high rate of speed is imparted to the endless carrier, and the latter having a number of cutter-heads arranged thereon I am enabled to manufacture a greater amount of excelsior in a given time at less cost than is possible with machines of the ordinary construction.

Having thus fully described my invention, what I claim as new, and desire to secure by Letters Patent, is—

1. In a machine for making excelsior, the combination of a series of feed-rollers arranged in pairs, the bearings for one roller in each pair being movable and those for the other stationary, a series of clamping-plates also arranged in pairs in front of the respective feed-rollers, and one plate in each pair having a movement that corresponds to that of said movable bearings, an endless carrier having a series of suitable cutter-heads mounted thereon, and suitable mechanism for actuating the carrier, substantially as set forth.

2. In a machine for making excelsior, the combination of a series of feed-rollers arranged in pairs, an endless carrier having a series of suitable cutter-heads mounted thereon, a flexible strip interposed between each two of the cutter-heads, and suitable mechanism for actuating the carrier, substantially as set forth.

3. In a machine for making excelsior, the combination of a suitable frame, revoluble drums mounted in the frame and having their peripheries provided with a series of depressions, an endless carrier arranged on the drums, a series of suitable cutter-heads mounted on the carrier and corresponding in contour with the depressions in said drums, a series of feed-rollers arranged in pairs in a plane parallel to that of the cutter-heads, and suitable mechanism for imparting a continuous motion to said carrier and an intermittent rotation to the rollers, substantially as set forth.

4. In a machine for making excelsior, the combination of a suitable frame, revoluble drums mounted in the frame and having their peripheries provided with a series of depressions, an endless carrier arranged on the drums, a series of suitable cutter-heads mounted on the carrier and corresponding in contour with the depressions in said drums, spurs projecting from the peripheries of the drums to come against the rear of the cutter-heads as the latter successively pass a given point, a series of feed-rollers arranged in pairs in a plane parallel to that of the cutter-heads, and a suitable mechanism for imparting a continuous motion to said carrier and an intermittent rotation to the rollers, substantially as set forth.

5. In a machine for making excelsior, the combination of a suitable frame, revoluble drums mounted in the frame, an endless carrier arranged on the drums and carrying a series of suitable cutter-heads, a driving-shaft geared to the drums, a disk fast on one of the drum-shafts and having a face thereof provided with a series of teeth arranged at an acute angle to its periphery, a transverse shaft carrying a pinion arranged to be actuated by said toothed disk, horizontal shafts geared to the transverse one and provided with a series of worms, and feed-rollers having their bearings on the frame and provided with pinions that mesh with said worms, substantially as set forth.

6. In a machine for making excelsior, the combination of a suitable frame, a series of feed-rollers having stationary bearings on the frame, rack-plates loosely arranged on said frame, another series of feed-rollers having their bearings on the rack-plates, vertical shafts carrying pinions arranged to mesh with said rack-plates, horizontal shafts geared to the vertical ones and severally provided with a disk, a weighted rope or chain arranged on each disk, a treadle connected to each rope or chain, an endless carrier having a series of suitable cutter-heads mounted thereon, and suitable mechanism for actuating the carrier, substantially as set forth.

7. In a machine for making excelsior, the combination of a suitable frame, a series of feed-rollers having stationary bearings on the frame, stationary clamping-plates arranged in front of said rollers, another series of feed-rollers and clamping-plates mounted on suitable carriages, suitable mechanism for automatically actuating the carriages in one direction and for imparting a reverse movement thereto at the will of the operator, an endless carrier having a series of suitable cutter-heads mounted thereon, and suitable mechanism for imparting a continuous movement to the carrier and an intermittent movement to the feed-rollers, substantially as set forth.

8. In a machine for making excelsior, the combination of a suitable frame, a series of feed-rollers arranged in pairs, inwardly-extended brackets secured to the frame between each pair of feed-rollers to support the blocks engaged by said rollers, an endless carrier having a series of suitable cutter-heads mounted thereon, and suitable mechanism for actuating said carrier and feed-rollers, substantially as set forth.

9. In a machine for making excelsior, the combination of a series of feed-rollers arranged in pairs, an endless carrier composed of two wire cables arranged on suitable drums, a series of heads having vertical slots and longitudinal grooves, clamping-plates having longitudinal grooves that unite with those in the heads to engage the chains or cables, a series of slitter-knives, and a single planer-knife secured to each head and extended through the slots therein, and suitable mechanism for actuating said carrier and feed-rollers, substantially as set forth.

10. In a machine for making excelsior, the combination of a suitable frame having side timbers provided with grooved tracks, an endless carrier having a series of suitable cutter-heads mounted thereon, and each of said heads provided with flanges that engage said tracks, a series of feed-rollers arranged in pairs, and suitable mechanism for actuating said carrier and feed-rollers, substantially as set forth.

In testimony that I claim the foregoing I have hereunto set my hand, at Menasha, in the county of Winnebago and State of Wisconsin, in the presence of two witnesses.

ADDISON M. LITTLE.

Witnesses:
J. L. FIEWEGER,
HARRY DE WOLF.